Patented Dec. 5, 1950

2,532,592

UNITED STATES PATENT OFFICE 2,532,592

REFRACTORY LINER MATERIAL

David Meyer, Canton, and Mathias G. Balzer, Dover, Ohio, assignors to Meyer-Balzer Fuel Unit, Incorporated, Dover, Ohio, a corporation of Ohio No Drawing. Application November 23, 1948, Serial No. 61,725

7 Claims. (Cl. 106—61)

The invention relates to a heat resisting refractory composition material, and more particularly to a porous refractory liner composition for furnace and combustion chambers, burner tubes, burner blocks, internal combustion engine manifolds, and the like. The invention embodies improvements over the invention disclosed in the prior co-pending application of said David Meyer, Serial No. 686,950, filed July 29, 1946, and entitled Fuel Burner Liner.

Refractory linings for burner tubes and combustion chambers for melting, forging and heat treating furnaces must be capable of withstanding extremely severe conditions. Such linings must resist very high temperatures without substantial deterioration; yet should have high heat insulating properties, facilitate combustion, and improve the efficiency of the fuel being burned. Prior refractory linings which are high in heat insulating quality are porous and quick to deteriorate, and those that have a relatively long life are substantially non-porous and hence relatively poor heat insulators.

In burners, the refractory lining should be of a porous and absorbent nature so as to promote substantially complete combustion and prevent fumes or carbon deposition in the burner. However, with the exception of the fuel burner liner composition disclosed in said application Serial No. 686,950, no prior refractory liner material for burners to our knowledge has had these qualities together with the ability to withstand high temperatures without substantial deterioration.

There are certain well-known clays which have high fusion properties and high heat resisting characteristics, but such clays have been unsatisfactory for lining burners or combustion chambers and the like, because in use they undergo substantial shrinkage which results in cracking, spalling, or otherwise breaking down. Other difficulties which arise in connection with using these clays for a liner material include the difficulty of providing a suitable binding material for uniting the clay particles, and the difficulty of applying such material to furnace walls and the like.

It is an object of the present invention to provide a novel refractory liner material capable of meeting the stringent requirements for liners for combustion chambers and burner tubes and the like.

Another object is to provide a novel refractory liner material which will withstand extremely high temperatures and rapid temperature changes without substantially deteriorating or breaking down.

Another object is to provide a novel refractory liner material which will become incandescent under high temperatures and radiate a maximum amount of heat without deterioration.

A further object is to provide a novel refractory liner material which has the property of facilitating complete combustion of the fuel mixture burned within the liner.

Another object is to provide a novel refractory liner material which is highly resistant at high temperatures to acid fumes which may be present within the combustion chamber.

A still further object is to provide a novel refractory liner material which has very high heat insulating properties and at the same time resists deterioration at high temperatures.

These and other objects and advantages apparent to those skilled in the art from the following description may be attained by the novel composition comprising the present invention, the nature of which is set forth in the following general statement, and a preferred embodiment of which is set forth in the following description and defined in the appended claims forming part hereof.

The nature of the novel refractory liner material may be stated in general terms as including a porous absorbent mixture of crushed high fusion non-shrinking basic clays and a binder, to which mixture is added a small proportion of a dry mixture of plaster of Paris, alum, permanganate of potash and salicylic acid.

We prefer to use a mixture of about 80% Missouri flint clay and about 3% Bolivar flint clay, with preferably about 17% Sagger or Ball clay as a binder, although other suitable binder material, such as dolomite, may be substituted for Sagger clay. Missouri clay and Bolivar clay are burned after being mined and then crushed to approximately pea size. The Sagger clay is used in the plastic condition as mined and is not burned. The three basic clays are mixed thoroughly in these proportions by first shredding the Sagger or Ball clay in its plastic form and mixing the shreds with the crushed flint clays. Water may be added to the mixture to make the moisture content about 5%, which renders the mixture plastic, and the plastic mass may be pressed into block form for convenient handling.

A dry mixture of the chemicals is prepared in the following proportions:

| | Parts |
|---|---|
| Plaster of Paris | 16 |
| Powdered alum | 1 |
| Permanganate of potash | 1 |
| Salicylic acid | 1 |

In order to thoroughly mix the dry mixture of chemicals with the clay mixture, the clay mass may be broken up into shreds and a small quantity of the dry mixture of chemicals sprinkled over the shreds. A quantity of the mixture of clay and chemicals is then rammed or pressed into a form, which may be a burner housing around a removable core, or the mixed mass may be rammed between a form and a furnace or combustion chamber wall by means of a pneumatic hammer. The principal function of the plaster of Paris is to form a protective coating around the other chemicals, because otherwise violent reactions are apt to take place between certain impurities in the clay and the other chemicals. Accordingly, other chemical powders which will form this coating may be used in place of the plaster of Paris.

In the case of forming a liner tube for a burner, alternate layers of the mixed clays and powdered chemical mixture may be rammed within the burner housing until a complete liner has been formed, as described in said application Serial No. 686,950. In preparing the refractory liner material for application to the walls of a combustion chamber or heating furnace, the dry mixture of chemicals which is sprinkled over the shreds of clay mixture is used in the approximate proportions of two gallons of powdered chemicals to about one ton of the finished mixture of clay and chemicals. Two gallons of a dry mixture of the chemicals in the proportions given weighs approximately sixteen pounds.

Although we prefer to use a mixture of Missouri clay and Bolivar clay with Sagger or Ball clay, we can use a mixture of Bolivar clay and Sagger or Ball clay or equivalent binder material without any Missouri clay. In such case, however, it is necessary to add some crushed firebrick to offset the shrinkage of the clay, because even though it has been burned, the Bolivar clay has a greater tendency towards shrinkage under high temperatures than does the Missouri clay. Accordingly, when the Missouri clay is omitted, we prefer to use about 70% pre-burned crushed Bolivar flint clay with about 10% of crushed firebrick and about 20% of Sagger or Ball clay. This mixture may be rammed or pressed within the burner housing or the like with alternate layers of the dry chemical mixture as described in said application Serial No. 686,950, or it may be wetted and formed into a plastic mass which is shredded and mixed by sprinkling the dry chemical mixture thereover, and then rammed into a form by a pneumatic hammer and the like, as previously described herein.

Either of the clay mixtures with the chemical mixture may, if desired, be pressed into uniform size plastic blocks or bricks by the use of a portable forming machine, and these plastic blocks may be laid up to provide a furnace or combustion chamber lining. Such blocks need not be dried or burned, but when laid up and the laying surface is wetted they become plastic and adhere.

It is to be understood that the proportions of the clays or the clays and firebrick, as well as the proportions of the chemical mixture which is added, are approximate and may be varied somewhat to produce liner material to suit different requirements of heat resistance and heat insulation. The preferred proportions as stated have been found in actual practice to produce very satisfactory results under conditions generally existing within most fuel burners and high temperature furnaces.

A liner of the foregoing composition has a porous and absorbent structure and will resist high temperatures without substantial deterioration. Due to the absorbent structure, the liner material has the property, especially in a burner tube, of absorbing atomized liquid fuel particles discharged into the tube from the usual burner tip, and the absorbed particles become instantaneously gasified to facilitate complete combustion of the fuel with a characteristic incandescent flame and no carbon deposition. Burners equipped with the improved liner composition will light instantaneously when cold without pre-heating, apparently because of the charge of fuel retained within the porous structure of the liner after previous use has been discontinued.

It has been found in actual practice that a combustion chamber lined with the improved refractory lining requires less fuel to maintain a required degree of temperature, apparently because of the substantially complete combustion which is facilitated by the presence of the porous refractory lining, and at the same time the actual life of the novel lining has been found to be considerably longer than that of prior refractory linings used under the same conditions. Moreover, the improved refractory lining will withstand rapid temperature changes without substantial deterioration, and is extremely resistant to the acid fumes generated in heating or melting furnaces by the oxidation of the metals being heated therein.

In actual practice, we have found that the improved liner material withstands temperatures of the order of 4,000° F. without substantial deterioration, and at such temperatures the liner becomes incandescent and promotes substantially complete combustion and maximum efficiency within the furnace. Moreover, the improved refractory liner material has very high heat insulating properties.

The reasons for all the advantages attained from the use of the novel refractory liner material in burner tubes, combustion chambers and the like, and the functions of all of the ingredients present in the material, are not fully understood. It may be that the action of the liner composition or some of the ingredients thereof is in part catalytic. However, the porous and absorbent character of the liner material, together with its high heat resisting and heat insulating properties, enables the attainment of substantially complete combustion with increased efficiency and minimum deterioration of the liner material.

The novel refractory liner material provides a porous, heat insulating composition which withstands high temperatures and temperature changes with a minimum amount of deterioration. It is suitable for lining burner tubes, and a variety of furnace and combustion chamber walls. It promotes complete combustion and greater fuel efficiency.

In the foregoing description, certain terms have been used for brevity, understanding and clarity, but no unnecessary limitations are to be implied therefrom beyond the requirements of the prior art, because such words are utilized for descriptive purposes herein and not for the purpose of limitation.

Having now described the features of the invention, and the composition of a preferred embodiment of novel refractory liner material; and having described the new and useful results attained and the problems solved; the novel and advantageous composition, together with reasonable equivalents obvious to those skilled in the art, is set forth in the appended claims.

We claim:

1. A porous refractory liner composition consisting of a body of non-shrinking high fusion basic flint clay and binder material, said body containing a small quantity of a mixture of equal parts of powdered alum, permanganate of potash and salicylic acid and sixteen parts of plaster of Paris, the ratio of the mixture to the total composition being approximately sixteen pounds to the ton.

2. A porous refractory liner composition consisting of a body of non-shrinking high fusion basic flint clay and a binder selected from the class consisting of Sagger clay, Ball clay, and dolomite, said body containing a small quantity of a mixture of equal parts of powdered alum, permanganate of potash and salicylic acid and sixteen parts of plaster of Paris, the ratio of the mixture to the total composition being approximately sixteen pounds to the ton.

3. A porous refractory liner composition consisting of a body of about 80% to 83% of non-shrinking high fusion basic flint clay with about 20% to 17% of binder material, said body containing a small quantity of a mixture of equal parts of powdered alum, permanganate of potash and salicylic acid and sixteen parts of plaster of Paris, the ratio of the mixture to the total composition being approximately sixteen pounds to the ton.

4. A porous refractory liner composition consisting of a body of about 80% to 83% of non-shrinking high fusion basic flint clay with about 20% to 17% of a binder selected from the class consisting of Sagger clay, Ball clay, and dolomite, said body containing a small quantity of a mixture of equal parts of powdered alum, permanganate of potash and salicylic acid and sixteen parts of plaster of Paris, the ratio of the mixture to the total composition being approximately sixteen pounds to the ton.

5. A porous refractory liner composition consisting of a body containing about 80% pre-burned and crushed Missouri flint clay, about 3% pre-burned and crushed Bolivar flint clay, and about 17% of a binder selected from the class consisting of Sagger clay, Ball clay, and dolomite, into said body containing a mixture of equal parts of powdered alum, permanganate of potash, salicylic acid and sixteen parts of plaster of Paris, the ratio of the mixture to the total composition being approximately sixteen pounds to the ton.

6. A porous refractory liner composition consisting of a body containing about 80% pre-burned and crushed Missouri flint clay, about 3% pre-burned and crushed Bolivar flint clay, and about 17% Sagger clay, said body containing a dry mixture of equal parts of powdered alum, permanganate of potash, salicylic acid and sixteen parts of plaster of Paris, said mixture being in the proportion of two gallons to one ton of the total liner composition.

7. A porous refractory liner composition consisting of a body containing about 80% pre-burned and crushed Missouri flint clay, about 3% pre-burned and crushed Bolivar flint clay, and about 17% of a binder selected from the class consisting of Sagger clay, Ball clay, and dolomite, said body containing a dry mixture of equal parts of powdered alum, permanganate of potash, salicylic acid and sixteen parts of plaster of Paris, said mixture being in the proportion of two gallons to one ton of the total liner composition.

DAVID MEYER.
MATHIAS G. BALZER.

REFERENCES CITED

The following references are of record in the file of this patent:

UNITED STATES PATENTS

| Number | Name | Date |
| --- | --- | --- |
| 1,204,211 | Tone | Nov. 7, 1916 |
| 2,458,285 | Meyer | Jan. 4, 1949 |